G. C. JETT.
DIFFERENTIAL TRANSMISSION MECHANISM.
APPLICATION FILED JUNE 8, 1918.
1,423,940.
Patented July 25, 1922.
3 SHEETS—SHEET 1.
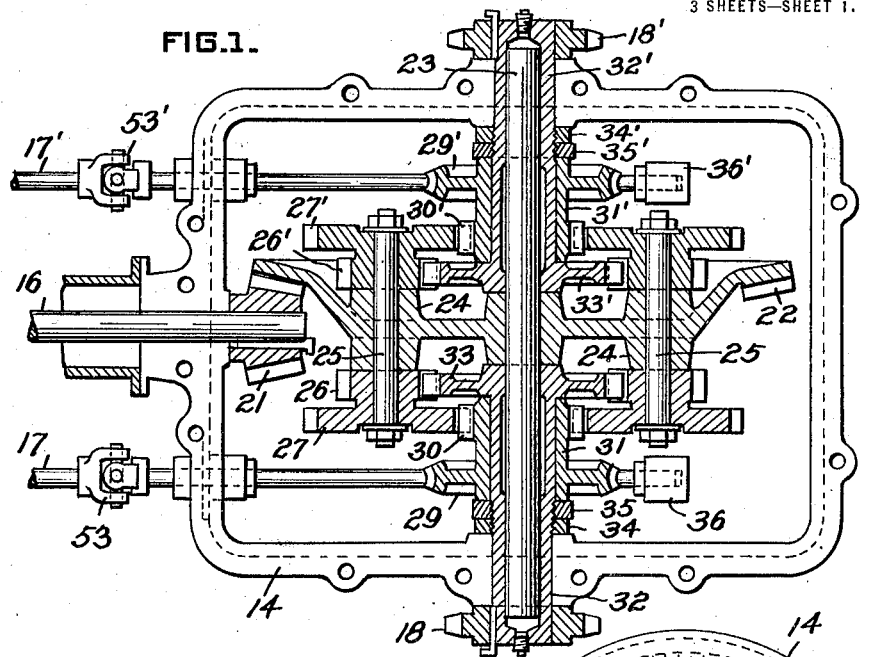
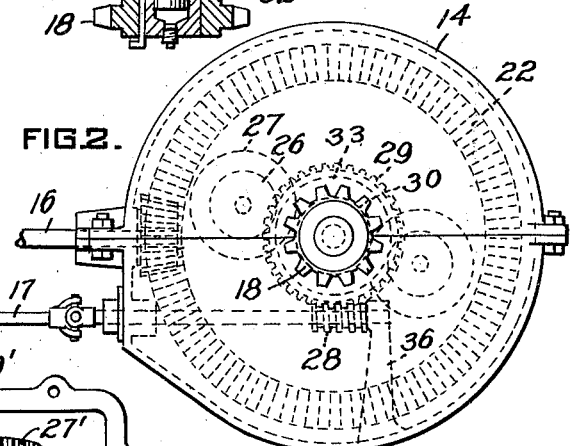
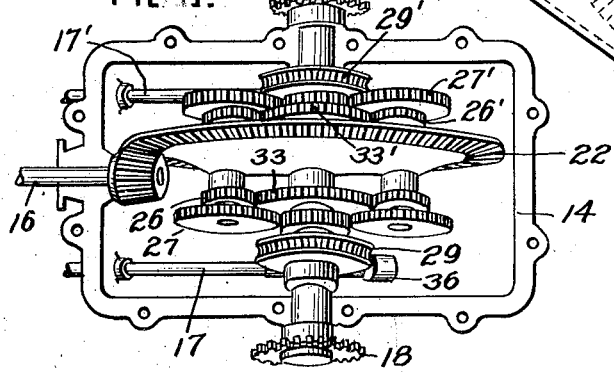
WITNESSES
W. Herbert Fowkes.
M. R. Lutz.
INVENTOR
George C. Jett,
By
Synnestvedt Bradley Lechner and Fowkes.

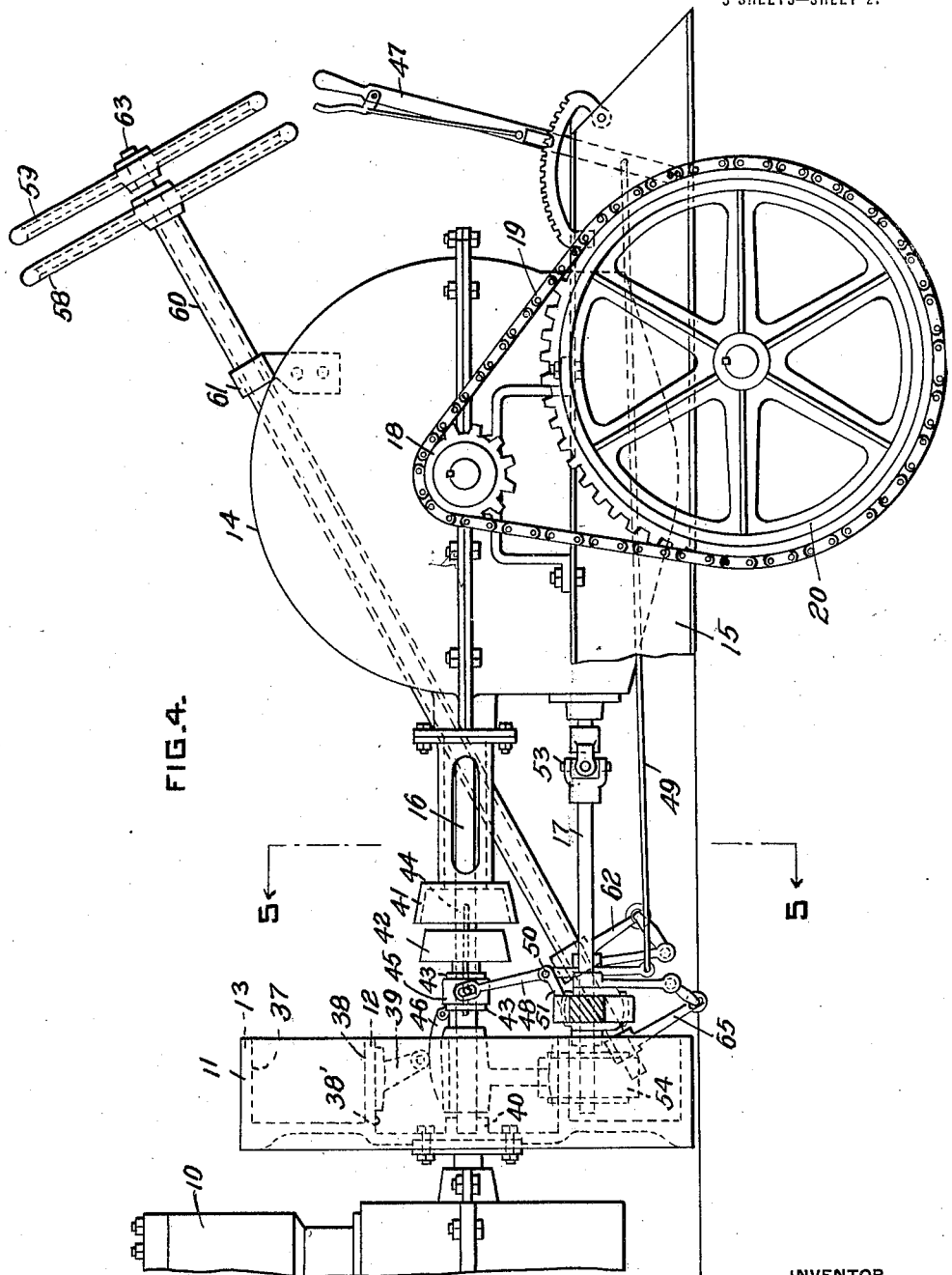

G. C. JETT.
DIFFERENTIAL TRANSMISSION MECHANISM.
APPLICATION FILED JUNE 8, 1918.
1,423,940.
Patented July 25, 1922.
3 SHEETS—SHEET 3.
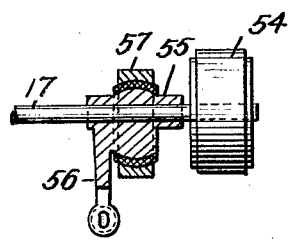
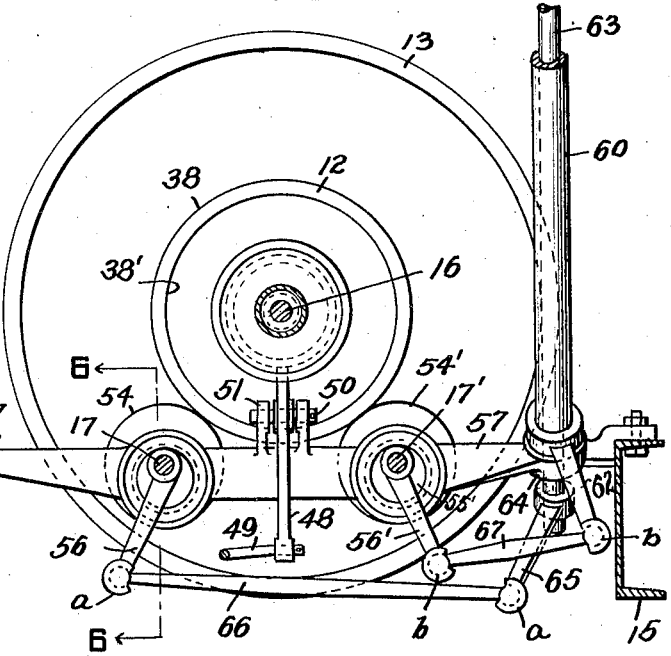
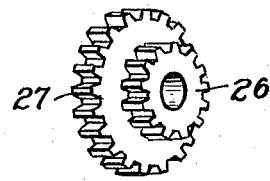
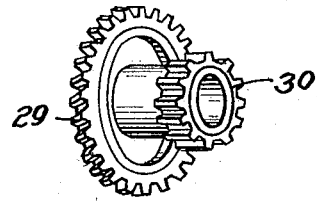
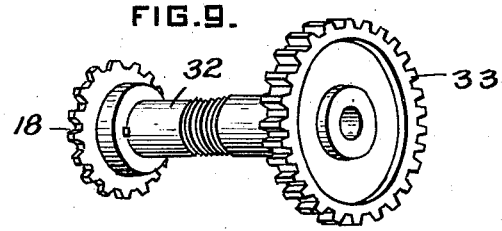
WITNESSES
W. Herbert Fowkes
M. R. Lutz
INVENTOR
George C. Jett
By
Symmertth Bradley Lechner Fowkes
Attys.

UNITED STATES PATENT OFFICE.

GEORGE C. JETT, OF WATERTOWN, WISCONSIN, ASSIGNOR, BY MESNE ASSIGNMENTS, OF TWO-FIFTHS TO WALTER H. STIEMKE, OF MILWAUKEE, WISCONSIN.

DIFFERENTIAL TRANSMISSION MECHANISM.

1,423,940.     Specification of Letters Patent.     Patented July 25, 1922.

Application filed June 8, 1918. Serial No. 238,977.

*To all whom it may concern:*

Be it known that I, GEORGE C. JETT, a citizen of the United States, residing at Watertown, in the county of Jefferson and State of Wisconsin, have invented certain new and useful Improvements in a Differential Transmission Mechanism, of which the following is a specification.

My invention relates to transmissions, and has reference more particularly to the provision of an improved differential and change speed mechanism capable of being employed in transmissions of general character, though in the present exemplification I show the invention as applied to the transmission of a tractor in which it may be advantageously employed.

The invention has for its primary objects: First, to provide a positively controlled differential and change speed mechanism, and wherein a change of gear ratio or a change in directional rotation may be instantly made without engaging or disengaging change gears. Second, to provide means in a mechanism of this sort effective for positively controlling the differentiation of speeds or dissimilar directional rotation and speeds of the delivered power on either side of the differential. Third, to provide in a differential an auxiliary drive means positively actuable to increase or decrease the rate of speed of the directional rotation of the driven members and to reverse such directional rotation. Fourth, to provide independently actuable and operable auxiliary drive or change speed mechanisms on both sides of the differential whereby opposite directional rotation is imparted to the driven members so that in the present exemplification the tractor is steered. Fifth, to provide auxiliary drive connections between a source of power and said mechanisms, said connections being readily disconnectible from the source of power, the one independently of the other, and each capable of relatively dissimilar directional rotation, whereby, for example, one of the driven members at one side may be rotated in a reverse or back-up direction by one of said change speed mechanisms, while the driven member on the other side is rotating in the same direction or in an opposite direction at any one of a number of forward speeds, and this without disturbing the meshed relation of the gears constituting such mechanisms. This latter feature is exceedingly advantageous as it simplifies construction, lowers cost, reduces weight, renders the changing of gear speeds fool-proof against breakage when in the hands of careless operators, and permits one to change speed instantly without throwing the machine out of gear and while the transmission is under motion and carrying its full or partial load: And sixth, in general to improve and simplify the construction and increase the efficiency and utility of mechanisms of this type.

These, together with such other objects and advantages as may hereinafter appear, or are incident to my invention, I attain by means of a construction, illustrated in preferred form in the accompanying drawings, wherein—

Figure 1 represents a horizontal sectional plan of a transmission embodying my invention;

Figure 2 is a side elevation of the casing therefor, the relation of certain parts of the transmission being indicated in dotted lines;

Figure 3 is a perspective view of the transmission;

Figure 4 represents a view in side elevation of the invention as applied to a tractor frame, the view illustrating the preferred operating mechanism for the main and auxiliary drives;

Figure 5 is a sectional view taken on line 5—5 of Fig. 4 and looking toward the flywheel;

Figure 6 is a similar view taken on line 6—6 of Fig. 5; and

Figures 7, 8 and 9 are enlarged detail views of certain gears of the transmission.

In the views, the reference numeral 10 denotes the motor, 11 its flywheel provided with inner and outer annular flanges 12 and 13, 14 the transmission casing, and 15 the frame upon which these members are mounted. The transmission is connected to the flywheel by a main drive shaft 16 and two auxiliary drive shafts 17 and 17' disposed below and one at each side of the shaft 16, the power transformed through the transmission members being delivered at the driven members or sprockets 18 and 18' at a reduced speed ratio. The connection between the three transmission drive shafts and the driven sprockets is by gear teeth throughout, therefore, although this transmission will deliver the power at the driven sprockets at a wide range of gear ratios, at certain combinations thereof, and at dissimilar velocity ratios on opposite sides of the transmission at 18 and 18', this delivered power at the transmission sprockets is always a positively geared ratio to the source of power.

Each of these driven members 18 and 18' is connected by a chain drive 19 to a tractive sprocket 20, which latter may be in a manner associated with the frame 15 and traction members (not shown) as similar sprockets are in the tractor described and illustrated in my Reissue Letters Patent No. 13,634 of October 21, 1913, the present transmission being in the nature of an improvement upon the transmission described in said patent.

The elements constituting the transmission will now be described. On the end of the main drive shaft 16, which, like the auxiliary drive shafts 17, 17', has a bearing in the casing 14, is keyed a bevel pinion 21. This pinion engages main bevel gear 22 which journals at its hub on a floating shaft 23 disposed transversely of the casing. A boss 24 is formed in the web of gear 22 to receive a securing pin or spindle 25 upon opposite ends of which are journalled the integral gears 26, 27 and 26' and 27'. As will be more clearly seen from an inspection of Figure 1, a duplicate set of these gears is provided at the other side of shaft 23 to ensure a balanced construction, all of which are carried around by bevel gear 22 in a planetary manner.

In describing the remaining members of the transmission only one side will be described as the gears at both sides of gear 22 are identical, the members at the other side bearing similar reference numerals with the addition of a prime mark in each case.

The shaft 17 has a worm 28 which has a driving connection with gear 27 through the medium of worm gear 29 and spur gear 30, worm gear 29 engaging worm 28 and spur gear 30 being in mesh with gear 27, and both members 29 and 30 having a common sleeve 31 which is bored out and journalled upon sleeve 32. The latter is similarly bored and journalled upon the shaft 23, and at its inner end is intergrally provided with a spur gear 33 engaging planetary gear 26, the other and outer end being journalled in the casing and having keyed to it the driven sprocket member 18. Thrust collars 34 and 35 on sleeve 32 and 34' and 35' on sleeve 32' serve to keep the transmission members in correct position longitudinally along floating shaft 23. In the casing are standards 36, 36' providing bearings for the worm ends of auxiliary shafts 17, 17', respectively. Shafts 16, 17 and 17' are independently actuable by the flywheel; each of the auxiliary shafts being capable of opposite directional rotation, independently of the other, and which is, as will hereinafter be seen, transmitted through the medium of the gear mechanism to the driven sprocket members 18 and 18', as is also the rotative movement of the main drive shaft 16. Before considering the gear movement and operation of the component parts of the drives, wherein my present invention more particularly resides, a brief description will be given of the shifting and braking mechanisms operatively employed in connection with the shafts, both main and auxiliary, as shown in Figures 4, 5 and 6.

Referring to these views, it will be seen that the annular flanges 13, 12 of the flywheel present outer and inner friction surfaces 37 and 38, respectively, and a band or friction surface 38' for a friction clutch member indicated generally at 39 and which is of the well known expanding ring type. The main shaft has its clutch end journalled axially of the flywheel in a bearing 40, and has loosely about it a brake cone ring 41 secured to the casing and adapted to co-operate with a brake cone 42 to brake the shaft. This brake cone is formed integrally with a clutch-spool 43 which has a slidable engagement with the shaft by means of a key 44, the spool providing a bearing for a trunnion ring 45 and having hinged to it a clutch operating cam 46 adapted to open and close the clutch expanding ring. The reference numeral 47 designates a hand lever and 48 a clutch operating lever whose upper forked end envelops the trunnion ring 45 to impart movement to it toward and from the brake ring when actuated by the hand-lever 47 through the medium of a connecting rod 49. The clutch operating lever is pivoted at 50 upon the arms 51 of a frame member or girder extending transversely of the frame members 15 and secured to them at its ends (Figure 5). In order to disengage the clutch 39 from the friction surface 38' and apply the brake to restrain the main drive shaft 16 from further rotation, hand lever 47 is advanced by the operator which in turn operates to move the clutch spool 43 back and thereby releases the clutch from operative engagement with the flywheel through the medium of cam 46 and roller 52 and brings into braking engagement brake members 41 and 42. The application of the brake to the main drive shaft may be effected independently and irrespectively of auxiliary shaft rotation.

These auxiliary shafts 17 and 17' have universal joints 53, 53' and have rigidly secured to their ends friction wheels 54, 54', respectively, whose diameter is slightly less than the distance between frictional surfaces 37, 38, with either of which they may be brought to engage by means now to be described, the universal joints affording the necessary flexibility of movement within the limits determined by said surfaces. Obviously, when either of the friction wheels is brought into engagement with surface 37 it rotates in one direction, and in the opposite and forward direction when it is in frictional contact with surface 38. Each of these shafts may be independently brought into engagement with the surfaces, for example, one may be in driving contact with surface 37 and the other with surface 38. Hence the shafts would then have opposite directional rotation, and it will be seen later that such rotation is carried or transmitted to the driven members 18, 18'. It is equally true that the auxiliary shafts may similarly rotate together, either forward or back-up, and in addition, the main drive may have forward movement on a direct drive when the auxiliary shafts are in process of having either a forward or a back-up directional rotation. In this way I attain four speeds forward and one reverse speed, and that without disengaging gears in changing from one rate of speed to another.

The auxiliary shaft 17 is journalled in an eccentric block 55 which in turn has a bearing in the transverse girder 57, the block being integrally provided with a depending lever 56. Similarly the auxiliary shaft 17' has associated with it block 55' and lever 56'. In order to actuate these levers, and their friction wheels 54 and 54' with reference to surfaces 37 and 38, I provide two hand-wheels 58 and 59, the former being secured to the outer tubular shaft 60 and having a bearing at 61 and a lever 62 at its lower end, and the latter having a solid shaft 63 which has a movable fit within tubular shaft 60. This solid shaft 63 is journalled near its lower end in bearing 64 and at its extreme end has lever 65 secured to it. Link 66 connects and has ball and socket joints *a* at its ends with the ends of levers 56 and 65, and link 67 similarly connects at *b* with the ends of levers 56' and 62. From the construction above described it will be apparent that lever 56' is actuated by hand-wheel 58 and lever 56 by hand-wheel 59.

In Figure 5, the friction wheels are shown in driving contact with inner friction surface 38. In order to disengage friction wheel 54, hand-wheel 59 is rotated a few degrees counter-clockwise, whereupon lever 56 will be moved to the right in its counter-clockwise rotation and wheel 54 will become disengaged and brought to neutral position between surfaces 37 and 38. A still further rotation of the hand-wheel will serve to bring this friction wheel 54 in engagement with flywheel surface 37. This will cause an opposite directional movement of wheel 54. Wheel 54' is similarly actuated by hand-wheel 58 rotated in a clockwise direction. Movement of the hand-wheels in reverse directions will, of course, return the friction wheels into engagement with flywheel surface 38, the movement of the one being independent of the other. To steer a vehicle having this transmission, and assuming that the friction wheels are positioned as shown in Figure 5, all that is required is to move one of the friction wheels into neutral position, and if a turn on a pivot is needed that wheel is still further moved to engage flywheel surface 37.

Reference will now be made to Figures 1, 2 and 3. Assuming that the friction wheels are in neutral position and the worms 28 and 28' locking the auxiliary shafts 17 and 17' against involuntary rotation, then with friction clutch 39 brought into operative engagement with flywheel surface 38', the bevel pinion 21 will actuate bevel gear 22, which in turn carries gears 26 and 27 around in a planetary manner having for the center of their planetary orbit the axis of the floating shaft 23. Since the ratio between gear set 27 and 30 is different from the ratio between the gear set 26 and 33, a rotary movement is imparted to gear 33 which carries on its sleeve 32 the driven sprocket 18. Obviously, identically the same movement occurs simultaneously at sprocket 18'. Therefore this transmission gives a speed reduction at the differential. This is the direct speed of the transmission or tractor.

Assuming that the main shaft is held against rotation by the brake, and removed from contact with the flywheel by lever 47, actuation of either auxiliary shaft 17 will serve to impart rotative movement through worm 28 to worm gear 29, which will in turn actuate gears 30, 27, 26, and 33, and driven sprocket 18. It will be seen that there is a great reduction of speed between the friction wheel and the driven sprocket member. This train of gear mechanism just referred to comprises a complete unit of itself and constitutes the auxiliary drive on the right hand side of the transmission. The auxiliary drive on the left hand side, and its actuation by shaft 17', is identical in all respects with that on the right hand side. Slow speed is obtained when both auxiliary drives are in driving contact with inner flywheel surface 38, and back-up or reverse when both are frictionally in engagement with outer surface 37. Now in the former of these two situations if one were to cut in the main shaft 16 and actuate it while the auxiliary shafts were rotating to provide slow speed at the driven members, the resultant would be the sum of the two speeds, namely, high speed. In the latter situation were the main shaft similarly cut in while the driven members were in reverse rotary movement, that is to say, a combination of direct and back-up speeds, one would have low speed as a resultant. As an example, in a given case where direct speed, i. e., when the main shaft is driving only, is rated at 4 miles an hour, the ratio of the various speeds, high speed, direct speed, low speed, slow speed, and reverse would be respectively 5:4:2:1:—2.

These proportional figures or relative rates of speeds serve as a convenient basis for amplifying the description already made of the steering operation, in regard to which reference has been made to the movement of one friction wheel into neutral position while the other was in frictional contact with the inner surface 38, in which case one traction member, such as one of the chain creeper trucks shown in my Reissue Patent No. 13,634, would advance at say one mile per hour, making a pivoting turn on the opposite creeper truck which would remain stationary. Moving the friction wheel from neutral to engage the outer flywheel friction surface 37, would operate to impart opposite directional rotation to this said friction wheel, hence one truck would be advancing at the rate of one mile per hour and the other turning backward at two miles per hour. This will turn the tractor around on a pivot and within its own length. Again, with one friction wheel in neutral and the other in engagement with outer flywheel surface 37, one creeper truck will be stationary and the other will back-up at say two miles per hour. Furthermore, with the main drive cut in and the tractor advancing at direct speed, say at four miles per hour, any one of the auxiliary drives may be driven by one of the flywheel frictional surfaces to differentiate the speed of creeper trucks, thereby turning the tractor on a long curve. It will be also apparent that one side of the transmission may be rotatively driving its creeper truck at low speed, direct speed, or high speed while the opposite side of the transmission may at the same instant be functioning in any one of these speeds.

In any one of these combinations of dissimilar speeds, the tractor will turn on long sweeping curves, and each combination is a positively geared ratio which steers the tractor in a circle of a definite radius.

As factors in understanding these directional rotations and rates of speed, it will be assumed, if not already stated or understood, that the flywheel has a counter-clockwise rotative movement, that the corresponding members of the two sides of the transmission have the same number of teeth and are identical in all substantial respects, and that the thread angle of the worm gear set is such that worm 28 will drive worm gear 29 but the latter will not drive the worm. This obviates the braking of the auxiliary drives. In addition it will also be understood that the diameters of the two friction wheels are the same, and that the driven sprockets are identical.

At each of the forward speeds, and at back-up or reverse speed, each creeper truck is positively geared at the same velocity ratio and both creepers rotate at the same velocity on their two-part shaft or axle as they would if fixed to one shaft. This keeps the tractor on a straight line. Tractors having a so-called free differential are subject to a sudden turning out of their course without warning, often endangering the life or limb of the operator, whenever a large clod or some small fixed obstruction is encountered. By providing, as I have, a positively controlled differential and change speed mechanism, this disadvantage has been entirely obviated, for the reason that both tractor trucks are positively geared through the transmission at all times.

From the foregoing, it will clearly be seen that the power is delivered to the transmission from its source through the novel arrangement and organization of three independent drives, one main drive and two auxiliary drives, the resultants of the power from these drives being transmitted to two driven members which deliver this resultant power at a wide range of equally or unequally reduced ratios, as may be desired.

What I claim is:

1. In a vehicle, the combination with a power plant and a pair of driven members, of a differential transmission comprising main and auxiliary drive mechanisms delivering power to said members and provided with means whereby said mechanisms are capable of being simultaneously or independently actuated to increase or decrease the common rate of speed of said driven members, when the vehicle is moving in a straight line, said auxiliary mechanism consisting of gearing sets adapted when independently actuated by said plant to create a variance in the speed ratios of said driven members to turn the vehicle.

2. In a vehicle, the combination with a power plant and a pair of driven members, of a differential transmission comprising main and auxiliary drive mechanisms delivering power to said members and provided with means whereby said mechanisms are capable of being simultaneously or independently actuated to increase or decrease the common rate of speed of said driven members, when the vehicle is moving in a straight line, said auxiliary mechanism consisting of gearing sets adapted when independently actuated by said plant to create a variance in the speed ratios of said driven members to turn the vehicle and having gears constituting a part of the main drive mechanism, the latter having a main gear arranged to deliver power through said gears to said members when said auxiliary mechanism is being actuated or is at rest.

3. The combination with a power plant having a power transmitting member, of a pair of relatively movable driven members, and a differential transmission comprising gearing constructed and arranged to impart similar and dissimilar directional rotation to said driven members and including auxiliary drive and change speed mechanisms having gearing co-operating with the aforesaid gearing and capable of being actuated by said power transmitting member whereby to provide a plurality of different speeds common to each of said driven members, both of said members rotating together at the same rate in either of said speeds.

4. The combination with a power plant, of a pair of relatively movable driven members, and a differential transmission constructed and arranged to impart similar directional rotation to said driven members including auxiliary drive and change speed mechanisms actuable by said power plant, and adapted when relatively actuated to differentiate the direction of such rotation and when actuated together as a unit to provide a plurality of forward and reverse rates of speed to said members, each of said mechanisms comprising a set of gears permanently meshed with the differential and capable of actuation by said power plant independently of the other.

5. In a vehicle, the combination with a power plant and a driven member, of a differential transmission mechanism including a two part drive means having gearing connecting the parts to each other and to said driven member, each part independently actuated by said power plant and both being capable of simultaneous actuation thereby, and being provided with controlling means whereby to positively impart to said driven member a plurality of speed ratios and opposed directional rotations while the transmission mechanism is under load and in motion.

6. The combination with a frame, a power plant, and driven members independently mounted in said frame, of a differential transmission constructed and arranged in said frame to impart forward directional rotation to said driven members and including a main drive and auxiliary drive mechanisms including gearing provided with connections with said power plant and capable of receiving positive actuation from said power plant to impart opposite directional rotation and to differentiate the rate of speed of said driven members.

7. The combination with a power plant and driven members, of a change speed gearing transmitting power from said plant, and an idler shaft, part of said gearing comprising a main gear on said shaft and another part comprising sets of differential gears operatively associated with the main gear and said driven members, the members of each of said sets permanently associated as a unit for movement about said shaft.

8. The combination with a power plant, of a pair of sleeved driven members, a positive controlling gear means provided with auxiliary driving connections with said plant for transmitting power to said members, gearing transmitting power from said plant to said members comprising a main gear concentric with said driven members, and differential change speed gears having members directly associated with said main gear and being meshed with said sleeved driven members and said controlling gear means.

9. The combination with a power plant, of a pair of sleeved driven members, a holding gear means, and gearing transmitting power from said plant to said members comprising a main gear concentric with said driven members and differential change speed gears having members directly associated with said main gear and meshed with said sleeved driven members and said holding gear means, the driven members movable relatively to those differential gear members that are associated with the holding means, and an idler shaft for said driven members and said holding gear means.

10. In a vehicle, the combination with a power plant having a power transmitting element, of a pair of driven members, a steering means, a speed reducing and speed transforming mechanism interposed between said means and said members and comprising a plurality of drive members independently actuated by said element and controlled by said means, and speed reducing gearing operatively connecting said drive members to said driven members, all constructed and arranged whereby to impart a plurality of speed ratios and directional rotations to said driven members.

11. In combination, a casing, a shaft in said casing, a main drive gear and a driven member positioned co-axially with said shaft, differential speed reduction gearing comprising as a part thereof a set of associated planetary gears disposed in meshed relation with a second set of relatively movable gears, and independently actuable members for said main gear and part of said second set of gears, the other part of said second set of gears having a drive connection with said driven member.

12. In combination, a shaft, a pair of relatively rotatable driven members, and a transmission therefor having a main gear and differential gear sets comprising inner and outer gear members meshed at each side of the main gear and adapted to differentiate the rotative speed of said driven members, part of said inner gear members provided with sleeves on said shaft on which said driven members are fixedly mounted, and power transmitting means for actuating part of the outer gear members of said sets.

13. In combination, a shaft, a pair of driven members, and a transmission therefor having a main gear adapted for association with a source of power and provided with differental gear sets comprising inner and outer gear members meshed at each side of the main gear and adapted to differentiate the speed and direction of rotation of said driven members, part of said inner gear members having sleeves on said shaft on which said driven members are mounted, and power transmitting means for actuating each of said gear sets, part of the outer gear members mounted for rotation about said sleeves.

14. In combination, a frame, a shaft in said frame, driven members on said shaft, a power plant in said frame having a power transmitting member, a transmission mechanism comprising a main gear on said shaft and spur and planetary gears at each side thereof, said planetary gears carried by said main gear and disposed in constant mesh with said spur gears, and part of said spur gears integral with said driven members, and driving members adapted for operative association with said power transmitting member and having a drive connection with another part of said spur gears.

15. In combination, a frame, a shaft in said frame, driven members on said shaft, a power plant in said frame having a power transmitting member, a transmission mechanism comprising a main gear on said shaft and spur and planetary gears at each side thereof said planetary gears carried by said main gear and disposed in constant mesh with said spur gears, and part of said spur gears integral with said driven members, and driving members adapted for operative association with said power transmitting member and having a drive connection with another part of said spur gears on both sides of the main gear, and manually operated means constructed and arranged for independently connecting and disconnecting said driving members from said power transmitting member; substantially as described.

16. In combination, a frame, a shaft in said frame, driven members on said shaft, a power plant in said frame having a power transmitting member, a transmission mechanism comprising a main gear on said shaft and spur and planetary gears at each side thereof, said planetary gears carried by said main gear and disposed in constant mesh with said spur gears, and part of said spur gears integral with said driven members, and driving members adapted for operative association with said power transmitting member and having a drive connection with another part of said spur gears on both sides of the main gear, manually operated means constructed and arranged for independently connecting and disconnecting said driving members from said power transmitting member, and a braking device for said main gear.

17. In combination, a casing, a shaft in said casing, a main gear on said shaft, a set of relatively rotatable spur gears movable about said shaft, at each side of the main gearing, driven sprockets movable with said spur gears, planetary gearing carried by said main gear in engagement with said spur gears, and independently actuable members for actuating the main gear and part of said spur gears, when said main gear is stationary, said spur gears and planetary gearing serving as change speed mechanism and a speed reduction means from the main gear to the sprockets.

18. In combination, a shaft, a pair of relatively rotatable driven members, and a transmission therefor having a main gear and differential gear sets comprising inner and outer gear members meshed at each side of the main gear and adapted to differentiate the rotative speed of said driven members, part of said inner gear members provided with sleeves on said shaft on which said driven members are fixedly mounted, and power transmitting means for actuating part of the outer gear members of said sets, members of said gear sets movable with the main gear to rotate the driven members through said sleeves while said part of the outer gear members is being held stationary by said means.

19. In a transmission, the combination of a main gear and a pair of driven sprockets, change speed gearing for said sprockets, a direct drive member for said main gear, auxiliary drive members for said change speed gearing, a power transmitting member having driving faces, and shift means operative to independently bring said drive members in driving contactual relation with said driving faces.

20. In a transmission, the combination of a casing, a shaft in said casing, a main gear on said shaft, a pair of spur gears relatively movable about said shaft at each side of said main gear, planetary gearing carried by said main gear and engaging said spur gears, driven sprockets movable with said spur gears during rotation of said main gear, and means co-operating with said spur gears for imparting similar directional rotation to said sprockets while said main gear is stationary.

21. In combination, a shaft, a pair of relatively rotatable driven members, and a transmission therefor having a main gear and differential gear sets comprising inner and outer gear members meshed at each side of the main gear and adapted to differentiate the rotative speed of said driven members, part of said inner gear members provided with sleeves on said shaft on which said driven members are fixedly mounted, power transmitting means for actuating part of the outer gear members of said sets, and said part of the outer gear members capable when rotated of providing a plurality of increased and decreased rates of speeds to said driven members common to each of said members, and to differentiate their direction of rotation without disengaging the meshed gears.

22. In combination, a shaft, a pair of relatively rotatable driven members, and a transmission therefor having a main gear and differential gear sets comprising inner and outer gear members meshed at each side of the main gear and adapted to differentiate the rotative speed of said driven members, part of said inner gear members provided with sleeves on said shaft on which said driven members are fixedly mounted, and holding means for part of the outer gear members of said sets, members of said gear sets movable with the main gear to rotate the driven members through said sleeves while said part of the outer gear members is being held stationary by said means, and said part of the outer gear member capable when rotated of providing a plurality of increased and decreased rates of speeds to said driven members common to each of said members, and to differentiate their direction of rotation without disengaging the meshed gears.

23. In combination, a shaft, a pair of driven members, and a transmission therefor having a main gear adapted for association with a source of power and provided with differential gear sets comprising inner and outer gear members meshed at each side of the main gear and adapted to differentiate the speed and direction of rotation of said driven members, part of said inner gear members having sleeves on said shaft on which said driven members are mounted, and an actuating and holding means for each of said gear sets, part of the outer gear members mounted for rotation about said sleeves, members of said gear sets movable with the main gear to rotate the driven members through said sleeves while said part of the outer gear members is being held stationary by said means, and said part of the outer gear members capable when rotated of providing a plurality of increased and decreased rates of speeds to said driven members common to each of said members, and to differentiate their direction of rotation without disengaging the meshed gears.

24. In combination, a pair of driven members, a main driving gear, driven gears connected with said driven members, a holding means including gears rotatable relatively to said driven gears, and integral different-sized speed reducing planetary pinions carried by said main gear at each side thereof and disposed in a permanently meshed relation with said holding and driven gears.

25. The combination with a source of power, and a pair of relatively movable driven elements, of a transmission therefor comprising three drive members, and gearing operatively connecting the members to said driven elements and associating the members in pairs with one member common to both pairs, said members actuated and controlled from said source and adapted to be actuated individually, or when paired, or simultaneously to impart variable speed ratios and directional rotations to said elements.

26. In a vehicle, the combination of a pair of driven members, a pair of power transmitting drive members provided with gearing delivering power to said driven members to drive the vehicle in a straight line, and being independently actuable to impart turning movement to said vehicle through said drive members, and a third power transmitting member operating through a part of said gearing to deliver power to said driven members independently of said other power transmitting members or concurrently with said members through all of said gearing to impart speed ratios to the vehicle varying from that at which the vehicle travels when said third power transmitting member is at rest.

27. The combination with a source of power, and a pair of relatively movable driven elements, of a transmission therefor comprising three drive units, and gearing operatively connecting the units in pairs and to said driven elements, said units independently actuated and controlled from said source.

28. In a transmission, the combination of a casing, a main drive member and a driven member co-axially positioned in said casing, a holding member, and a differential mechanism interposed between the holding member and said driven member comprising as a part thereof a pair of integral planetary gears carried by said main drive in a meshed relation with gears composing the other part of said mechanism, said last mentioned gears relatively movable and being respectively secured to the holding member and the driven member.

29. In a vehicle, the combination with a power plant and a pair of driven members, of a main drive adapted to deliver power from said plant to said driven members, an auxiliary drive for each of said members, and a differential change speed mechanism for each auxiliary drive, said auxiliary drives operatively connected with said plant whereby power is transmitted simultaneously to said driven members through said differential change speed mechanisms independently of the main drive, and all said drives constructed and arranged for both relative and synchronous rotation whereby to vary the speed and directional rotation of said driven member, and means for selectively engaging and disengaging said drives with and from said plant.

30. In combination with a power plant and a pair of driven members, a pair of relatively independent holding members, an auxiliary drive for each of said holding members, a main drive for said driven members, and a positively controlled differential mechanism interposed between each of said holding members and said driven members, said drives transmitting power from said power plant to said driven members, through said differential mechanism and being capable of both independent and simultaneous actuation to vary the speed and directional rotation of said driven members, each of said mechanisms comprising as a part thereof a pair of planetary gears having a common axis and disposed in a constant meshed relation with gears composing the other part of said mechanism, said gears constructed to serve as a speed reduction means during actuation of the main drive.

31. The combination of a plurality of driven members, a differential driving mechanism including a main transmission set and a plurality of auxiliary transmission sets each connected with its respective driven member and with said main transmission set, means for locking or driving said main transmission set at will, and means for independently locking or driving each of said auxiliary transmission sets in either direction at will, whereby the conjoint action of said main and auxiliary sets serves to lock or to drive said driven members at variable speeds in either direction.

32. The combination with a source of power, of a pair of driven members, a main transmission set, a pair of auxiliary transmission sets each connected to one of said driven members, and independent means for driving each transmission set individually so that the speed and direction of rotation of each driven member is the resultant of the movements of the main transmission set plus the movements of its respective auxiliary transmission set.

33. The combination with a source of power, of a pair of driven members, an auxiliary transmission set connected with each member, a main transmission set connected to said respective auxiliary sets, and connections between each of said sets and the source of power whereby each set may be driven at will.

34. In a device of the class described, a driving member, two driven members both driven from the said driving member, a planetary transmission between each driven member and said driving member, each planetary transmission comprising a first rotatable gear and a second gear rotatable about said first rotatable gear and meshing therewith, and means for controlling the speed of said first gear comprising a friction wheel, and two friction wheels engaging said first friction wheel, one controlling the speed of one of said first gears and the other controlling the speed of the other of said first gears.

35. In a device of the class described, a driving member, two driven members both driven from the said driving member, a planetary transmission between each driven member and said driving member, each transmission comprising a first rotatable gear and a second gear revoluble about said first gear and meshing therewith, and means for definitely controlling the speed and direction of rotation of said first gears, said means comprising a friction wheel provided with flanges, two friction wheels disposed between said flanges one for each of said first gears, and means for shifting the last two wheels to engage them with either of the flanges of said first wheel.

36. The combination of two driven members, a differential gear mechanism for driving one member, a differential gear mechanism for driving the other member, a common driving means for said differential gear mechanisms whereby said common driving means acts to drive both of said members, and means driven by said driving means for varying the speed of each member without varying the speed of the other of said driving means.

37. The combination of two driven members, a differential gear mechanism for driving one member, a differential gear mechanism for driving the other member, a common driving means for said differential gear mechanisms whereby said common driving means acts to drive both of said members, a frictional driving device affecting one of said differential gear mechanisms to vary the operation of the member driven thereby with respect to the driving means, and another frictional driving device affecting the other differential gear to vary the operation of the member driven thereby with respect to the driving means.

38. The combination of two driven members, differential driving apparatus for driving both of said members, and friction means adapted to drive, lock or reverse either member without varying the operation of the other member.

GEORGE C. JETT.